(12) United States Patent
Saitou et al.

(10) Patent No.: US 7,849,714 B2
(45) Date of Patent: Dec. 14, 2010

(54) DEHYDRATION-SINTERING FURNACE

(75) Inventors: Manabu Saitou, Chiba (JP); Naritoshi Yamada, Chiba (JP)

(73) Assignee: Fujikura Ltd., Tokyo (JP)

( * ) Notice: Subject to any disclaimer, the term of this patent is extended or adjusted under 35 U.S.C. 154(b) by 1037 days.

(21) Appl. No.: 11/004,930

(22) Filed: Dec. 7, 2004

(65) Prior Publication Data

US 2005/0120753 A1 Jun. 9, 2005

(30) Foreign Application Priority Data

Dec. 8, 2003 (JP) ............................. P2003-409071

(51) Int. Cl.
    *C03B 37/018* (2006.01)
(52) U.S. Cl. .............................. 65/426; 65/416; 65/422
(58) Field of Classification Search .................. 65/416, 65/422, 426, 427, 507, 530, 532
    See application file for complete search history.

(56) References Cited

U.S. PATENT DOCUMENTS 3,261,626 A * 7/1966 Kropp et al. ................. 403/288
4,421,540 A * 12/1983 Nakahara et al. .............. 65/379
4,726,764 A * 2/1988 Yoshikai ....................... 432/24

FOREIGN PATENT DOCUMENTS

| JP | 60-122741 A | 7/1985 |
| JP | 61-261223 A | 11/1986 |
| JP | 62-153132 A | 7/1987 |
| JP | H05-004828 A | 1/1993 |
| JP | H06-127964 A | 5/1994 |
| JP | H06-50513 Y2 | 12/1994 |
| JP | 8-2936 A | 1/1996 |
| JP | H10-120428 A | 5/1998 |
| JP | 2003-167144 A | 6/2003 |
| JP | 3559276 B1 | 5/2004 |

* cited by examiner

*Primary Examiner*—Queenie Dehghan
(74) *Attorney, Agent, or Firm*—Sughrue Mion, PLLC

(57) ABSTRACT

A dehydration-sintering furnace includes a core tube configured to dehydrate and sinter a porous base material in fabrication of an optical fiber and having an outlet configured to discharge a vapor. The furnace includes a pressure-variation damper connected to the outlet of the core tube. The furnace includes a trap between the core tube and the pressure-variation damper for collecting the vapor.

12 Claims, 10 Drawing Sheets

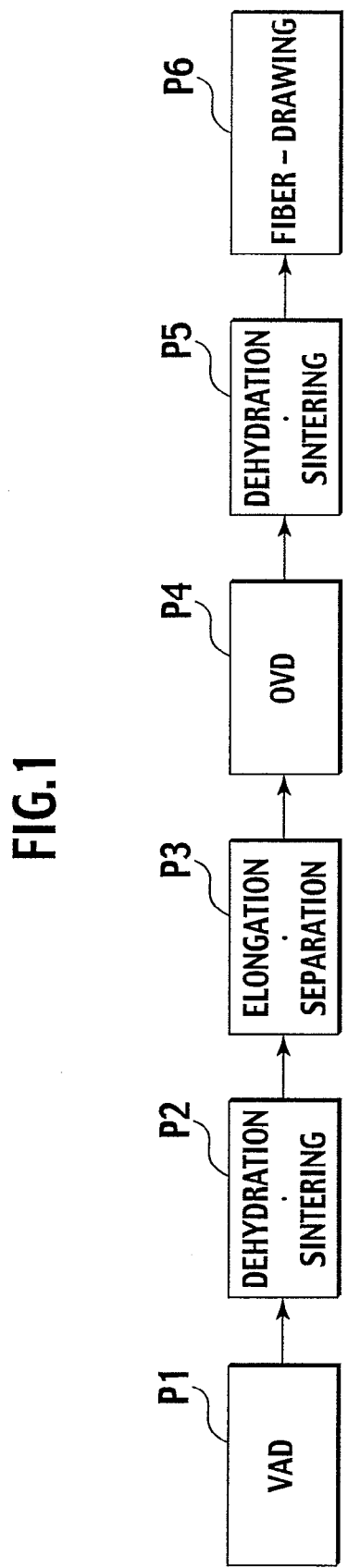

DEHYDRATION-SINTERING FURNACE

CROSS-REFERENCE TO RELATED APPLICATIONS

This application is based upon and claims the benefit of priority from Japanese Patent Application No. 2003-409071 filed on Dec. 8, 2003; the entire contents of which are incorporated herein by reference.

BACKGROUND OF THE INVENTION

The present invention relates to a dehydration-sintering furnace, and specifically relates to a dehydration-sintering furnace which performs dehydration processing and sintering processing of an optical fiber (glass fiber) base material in fabrication of an optical fiber.

A porous base material is produced by use of a VAD (Vapor phase Axial Deposition) method, an OVD (Outside Vapor Deposition) method, or the like. A dehydration-sintering furnace includes a core tube (muffle) which houses the porous base material, and a heater. The porous base material is heated and dehydrated, with a dehydrating agent such as chlorine gas and thionyl chloride, and an inert gas such as helium gas supplied into the core tube. Thereafter, the porous base material is heated and sintered in the inert gas atmosphere such as helium gas (another gas may be included, if needed), thus obtaining the optical fiber base material.

The dehydration-sintering furnace, which performs dehydration and sintering of the optical fiber base material as described above, includes the core tube. The core tube is connected to a pressure-variation damper, in order to avoid a large variation in an internal pressure of the core tube, and to keep the internal pressure of the core tube as constant as possible. The pressure-variation damper includes, for example, a balloon-type pressure buffer, a gas flow buffering chamber, a solenoid valve-controlled pressure-variation absorbing container, and the like (for example, Patent Documents 1 to 4: Patent Document 1: Utility Model Application Laid-Open Publication After Examination No. Hei 6 (1994)-50513; Patent Document 2: Japanese Patent Laid-Open Publication No. Hei 5 (1993)-4828; Patent Document 3: Japanese Patent Laid-Open Publication No. Hei 6 (1994)-127964; Patent Document 4: Japanese Patent Laid-Open Publication No. Hei 10 (1998)-120428).

Although the pressure-variation damper connected to the core tube is effective in absorbing a short-period pressure variation in the core tube, the pressure-variation damper has the following problems.

When the pressure in the core tube is high, gas in the furnace is pushed out of the core tube into the pressure-variation damper. On the other hand, when the pressure in the furnace drops, gas in the pressure-variation damper is returned into the core tube.

Specifically, in a dehydration processing step, removed moisture moves into the pressure-variation damper, and a part of the moisture is returned into the core tube. This deteriorates a dehydration ability.

Such a phenomenon has not heretofore become a significant problem. However, the phenomenon raises a problem, for example, in the following two cases. The first is the case of fabricating a recently increasingly demanded optical fiber with a reduced OH peak which appears at a wavelength of about 1385 nm in a transmission loss curve of the optical fiber (for example, Patent Document 5: Japanese Patent Laid-Open Publication No. 2003-167144). The second is the case of performing dehydration and sintering of a large-size base material having a large absolute amount of moisture contained in a porous base material.

SUMMARY OF THE INVENTION

It is an object of the present invention to provide a dehydration-sintering furnace with a pressure-variation damper which prevents moisture that has moved into the pressure-variation damper from returning into a core tube. This prevents deterioration in a dehydration ability of the dehydration-sintering furnace due to returning of the moisture, thus allowing for fabrication of a high-performance optical fiber having a small transmission loss.

The first aspect of the invention provides a dehydration-sintering furnace. The furnace includes a core tube configured to dehydrate and sinter a porous base material in fabrication of an optical fiber and having an outlet configured to discharge a vapor. The furnace includes a pressure-variation damper connected to the outlet of the core tube. The furnace includes a trap between the core tube and the pressure-variation damper for collecting the vapor.

The trap may include a trap tank configured to liquefy and collect the vapor.

The furnace may further include a cooling device configured to cool the trap tank.

The trap may be positioned vertically lower than the outlet.

The second aspect of the invention provides a method of fabricating a coated optical fiber. The method includes the step of depositing glass particles produced by reacting a raw material containing a silicon compound in a flame, producing a porous base material. The method includes the step of dehydrating and sintering the porous base material in a core tube, regulating internal pressure of the core tube, thus producing an optical fiber base material. The method includes the step of drawing the optical fiber base material to produce a coated optical fiber. The method includes the step of trapping a vapor discharged from the core tube during producing of the optical fiber base material.

The hydration-sintering furnace includes the trap such as a trap tank to collect a vapor. In the dehydration processing step, the core tube produces a vapor containing moisture. The vapor is collected by the trap, while passing through the trap, thus preventing the moisture from returning into the core tube.

This avoids deterioration in dehydration ability of the dehydration-sintering furnace due to returning of moisture. Thus, fabrication of an optical fiber with a reduced OH peak, which appears at a wavelength of about 1385 nm in a transmission loss curve of the optical fiber, provides a high-performance optical fiber having a small transmission loss.

BRIEF DESCRIPTION OF THE ACCOMPANYING DRAWINGS

FIG. 1 is a block diagram illustrating the processes of fabricating a coated optical fiber.

DETAILED DESCRIPTION OF THE PREFERRED EMBODIMENTS

The first figure describes an example of the fabrication of a coated optical fiber.

In FIG. 1, the coated optical fiber is fabricated through VAD (P1), dehydration and sintering (P2), elongation and separation (P3), OVD (P4), dehydration and sintering (P5), and fiber-drawing (P6).

Figure 2A:
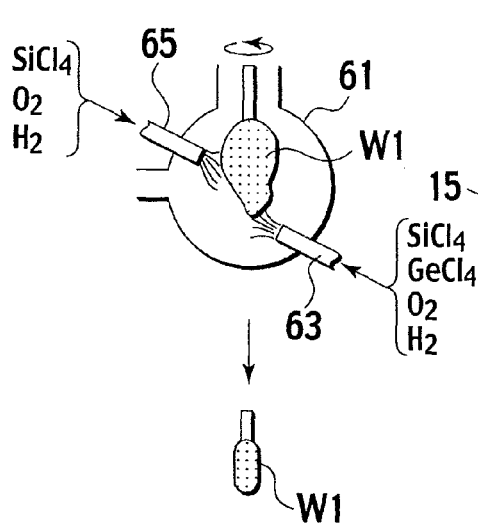
FIGS. 2A to 2F are schematic diagrams illustrating devices in the respective fabrication processes of FIG. 1.

To be more specific, in FIG. 2A, a porous base material W1 is produced by use of a VAD method (P1). Specifically, raw materials of gaseous silicon tetrachloride ($SiCl_4$), germanium tetrachloride ($GeCl_4$), oxygen ($O_2$), and hydrogen ($H_2$) are simultaneously supplied to a core burner 63. The raw materials of the gaseous silicon tetrachloride ($SiCl_4$), oxygen ($O_2$), and hydrogen ($H_2$) are simultaneously supplied to a clad burner 65. The silicon tetrachloride and the germanium tetrachloride react with each other on hydrolysis in oxyhydrogen flame, producing glass particles that are doped with germanium. The particles are deposited around a rotating master rod, forming a core. Glass particles are further deposited around the core, producing the porous base material W1. In this process, the porous base material W1 takes in a large amount of moisture from the oxyhydrogen flame.

Figure 2B:
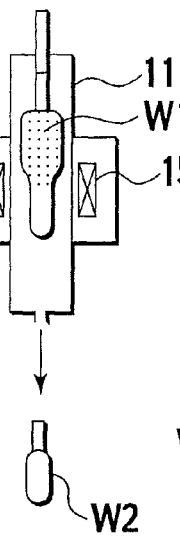

In FIG. 2B, the porous base material W1 is set in a core tube 11 and heated by a heater 15. First, with a dehydrating agent supplied to the core tube 11, the porous base material W1 is dehydrated at about 1200° C. to 1400° C. Next, with an inert gas supplied into the core tube 11, the porous base material W1 is sintered at about 1400° C. to 1600° C., turning into a VAD base material W2 (P2).

Figure 2C:
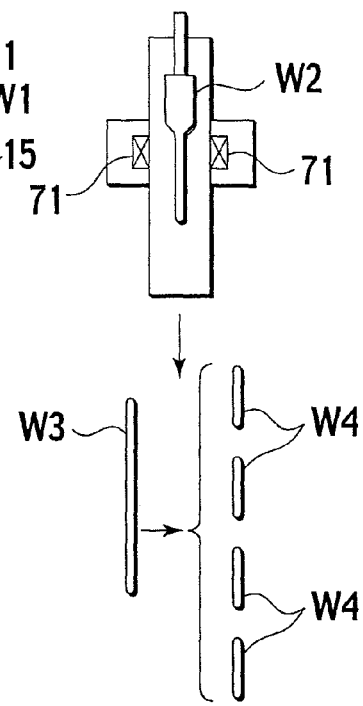

In FIG. 2C, the VAD base material W2 is heated by a heater 71 at about 2000° C. to 2300° C., and is softened. The VAD base material W2 is pulled into an elongated rod W3. The elongated rod W3 is separated into a plurality of core rods W4 (P3).

Figure 2D:
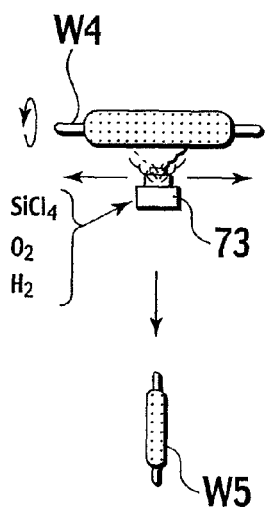

In FIG. 2D, a porous base material W5 is produced by use of an OVD method (P4). As in the case of the VAD method, the core rod W4 is set in the core tube 11. The raw materials of gaseous silicon tetrachloride ($SiCl_4$), oxygen ($O_2$), and hydrogen ($H_2$) are simultaneously supplied to a burner 73 and react with each other in a flame, producing glass particles. The burner 73 moves back and forth in a longitudinal direction of the core rod W4, allowing the glass particles to be deposited on the outer surface of the core rod W4, producing the porous base material W5. In this process, the porous base material W5 takes in a large amount of moisture.

Figure 2E:
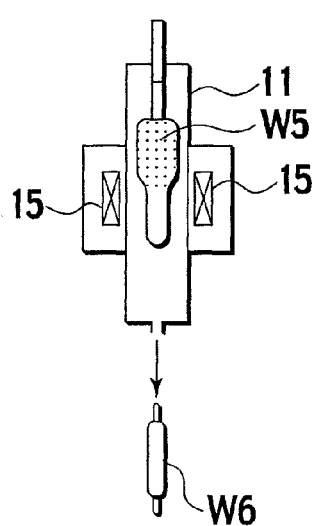

In FIG. 2E, the porous base material W5 is heated again, in the core tube 11, by the heater 15. Thus, the porous base material W5 is dehydrated and sintered into an optical fiber base material W6 (P5).

Figure 2F:
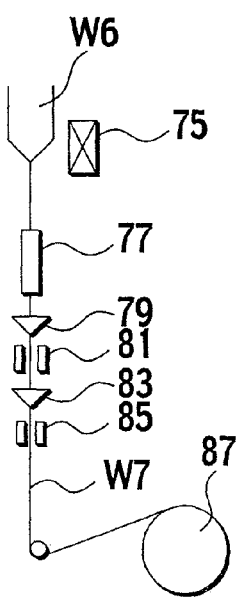

In FIG. 2F, the optical fiber base material W6 is heated at about 2000° C. by a heater 75. The tip of the optical fiber base material W6 is melted and is elongatedly drawn out. The elongated glass is cooled by a cooling tube 77. Next, the base material is covered with UV-cured resin by covering devices 79 and 83. At each time of covering, the resin is cured by UV irradiation devices 81 and 85. Thus, a coated optical fiber W7 is obtained. The coated optical fiber W7 is wound around a bobbin 87 (P6).

The above-described dehydration and sintering process (P2 and P5) employs the dehydration-sintering furnace according to the present invention.

Figure 3:
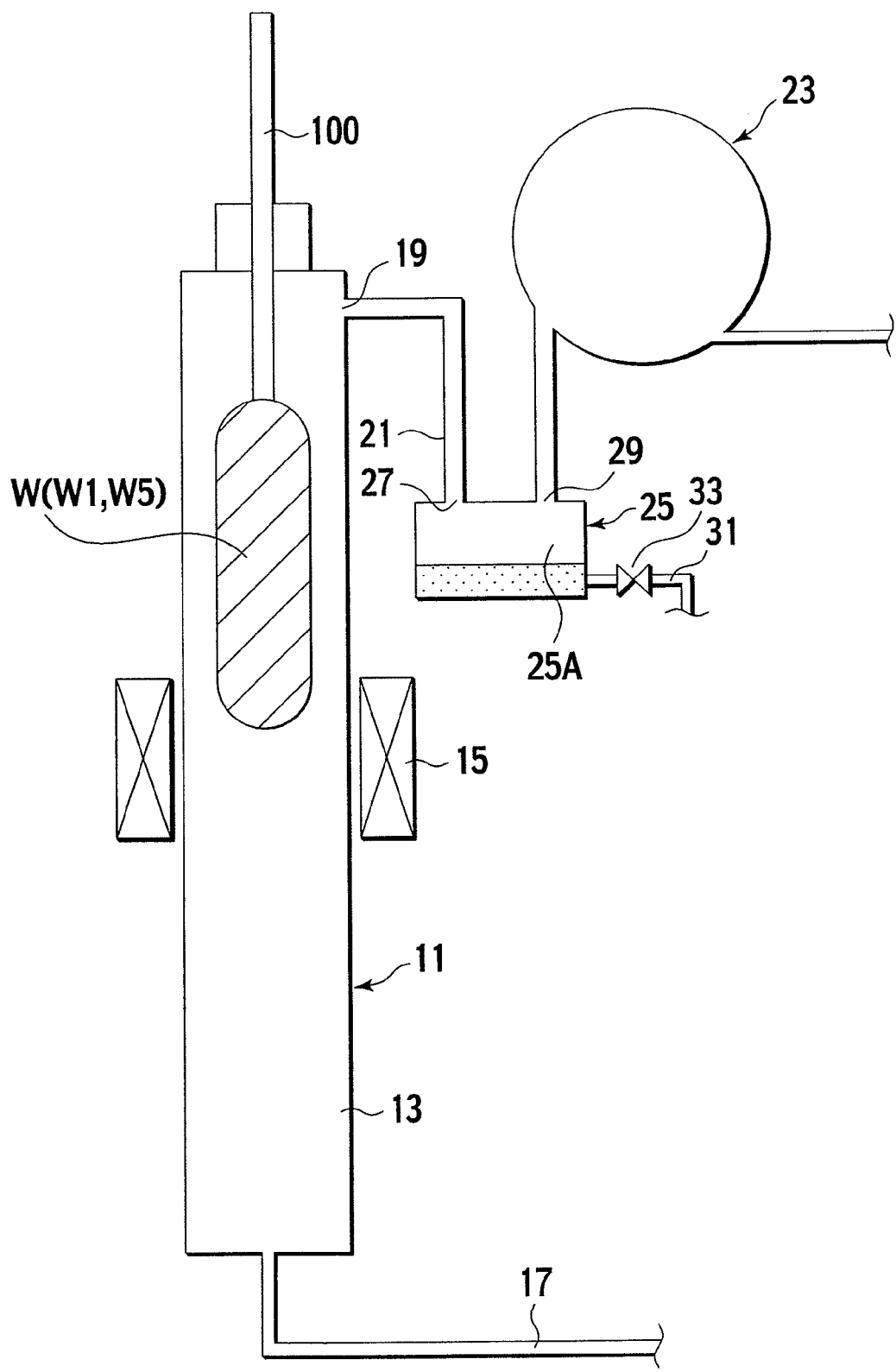
FIG. 3 is a schematic diagram illustrating a dehydration-sintering furnace of a first embodiment.

With reference to FIG. 3, the following describes a dehydration-sintering furnace of a first embodiment.

The dehydration-sintering furnace includes, as a furnace main body, the quartz glass closed core tube (muffle) 11. The core tube 11 houses, in a furnace interior 13, the optical fiber base material W (W1 and W5) made of a glass particle perform, which is suspended by use of a master rod 100.

The outside of the core tube 11 has the heater 15 for heating the optical fiber base material W in the furnace interior 13.

The bottom of the core tube 11 communicates with and connects to a gas introduction pipe 17. The gas introduction pipe 17 supplies a dehydrating agent such as chlorine gas and thionyl chloride, and an inert gas such as helium gas, to the furnace interior 13.

The core tube 11 has an outlet 19 at the upper part. The outlet 19 is connected to a pressure-variation damper 23 through a conduit 21. The pressure-variation damper 23 may be one which is publicly known, such as a balloon-type pressure buffer, a gas flow buffering chamber, a solenoid valve-controlled pressure-variation absorbing container, or the like. Detailed description thereof will be omitted.

In the middle of the conduit 21, that is, between the core tube 11 and the pressure-variation damper 23, a trap tank 25 which liquefies and collects vapor is provided as a trap for performing vapor collection. The trap tank 25 is disposed in a position lower than those of the outlet 19 and the pressure-variation damper 23 in a vertical direction.

The trap tank 25 is provided in the room temperature atmosphere. The trap tank 25 has fluid port openings 27 and 29 at the upper part. One of the fluid port openings 27 communicates with and connects to the outlet 19 of the core tube 11. The other fluid port opening 29 communicates with and connects to the pressure-variation damper 23. Vapor generated in the core tube 11 flows through a vapor phase part 25A in the tank 25.

The trap tank 25 is connected to a drain pipe 31 for drainage. The drain pipe 31 is provided with a drain valve 33.

The trap tank 25 is made of a material not corroded by hydrochloric acid that is contained in vapor discharged from the core tube 11. This material is, for example, a glass or a resin. This resin is, for example, polytetrafluoroethylene (PTFE) or polyvinyl chloride (PVC).

In the dehydration-sintering furnace having the configuration as described above, the heater 15 heats the core tube 11 in the inert gas atmosphere. This heats and dehydrates the optical fiber base material W in the furnace interior 13.

In the above-described dehydration processing step, when a pressure in the furnace interior 13 increases, gas in the furnace flows from the core tube 11 through the trap tank 25 to be pushed into the pressure-variation damper 23. On the other hand, when the pressure in the furnace interior 13 drops, the gas in the pressure-variation damper 23 returns into the core tube 11 through the trap tank 25. This suppresses a pressure variation in the furnace interior 13.

In a gas flow between the furnace interior 13 and the pressure-variation damper 23, vapor containing moisture, produced in the furnace interior 13, is liquefied by natural cooling while passing through the trap tank 25, and is stored in the trap tank 25 in liquid form.

Thus, the vapor containing moisture, which is produced in the furnace interior 13, is collected by the trap tank 25.

Accordingly, the moisture does not return to the furnace interior 13. This avoids deterioration of a dehydration ability of the dehydration-sintering furnace. Therefore, also in the fabrication of an optical fiber with a reduced OH peak which appears at a wavelength of about 1385 nm in a transmission loss curve of the optical fiber, a high-performance optical fiber having a small transmission loss can be efficiently fabricated.

Optical fibers are fabricated with and without the trap tank. As to the optical fibers finally obtained while setting the other conditions the same, transmission losses are measured at the wavelength of 1385 nm. The result of the case without the trap tank is an average of about 0.291 dB/km to about 0.296 dB/km. Meanwhile, the result of the case with the trap tank is reduced to about 0.278 dB/km to about 0.274 dB/km.

The trap tank 25 is placed in the position lower than that of the outlet 19 of the core tube 11. Thus, the liquid stored in the tank does not flow back to the furnace interior 13. The liquid stored in the trap tank 25 is discharged to the outside from the drain pipe 31 through the drain valve 33 to be regularly opened.

Figure 4:
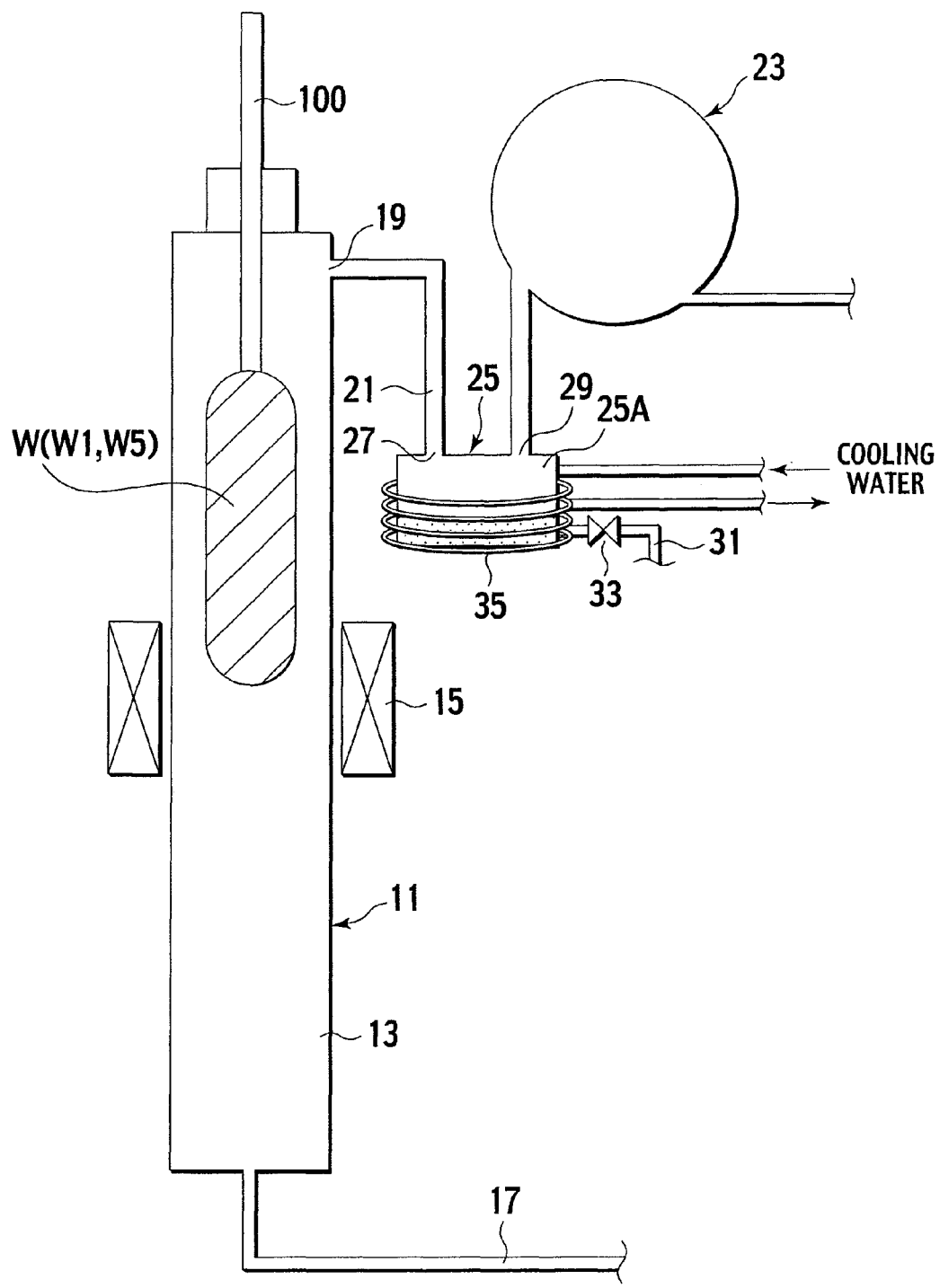
FIG. 4 is a schematic diagram illustrating a dehydration-sintering furnace of a second embodiment.

The following describes a dehydration-sintering furnace of a second embodiment with reference to FIG. 4. Note that, in FIG. 4, parts corresponding to those in FIG. 3 are denoted by the identical reference numerals as those in FIG. 3, and description thereof will be omitted.

The dehydration-sintering furnace of the second embodiment includes a heat exchanger 35 which is provided outside the trap tank 25. The heat exchanger 35, as a liquid cooling device, cools the trap tank 25. Cooling water is supplied to the heat exchanger 35.

Thus, heat exchange is performed between the cooling water and the trap tank 25, allowing the trap tank 25 to be cooled. The cooling of the trap tank 25 allows the vapor containing moisture, which is produced in the furnace interior 13, to be forcibly cooled and efficiently liquefied during passing of the vapor through the trap tank 25. As a result, the trap tank 25 collects and liquefies the vapor containing moisture, which is produced in the furnace interior 13, thus highly preventing the moisture from returning to the furnace interior 13.

Figure 5:
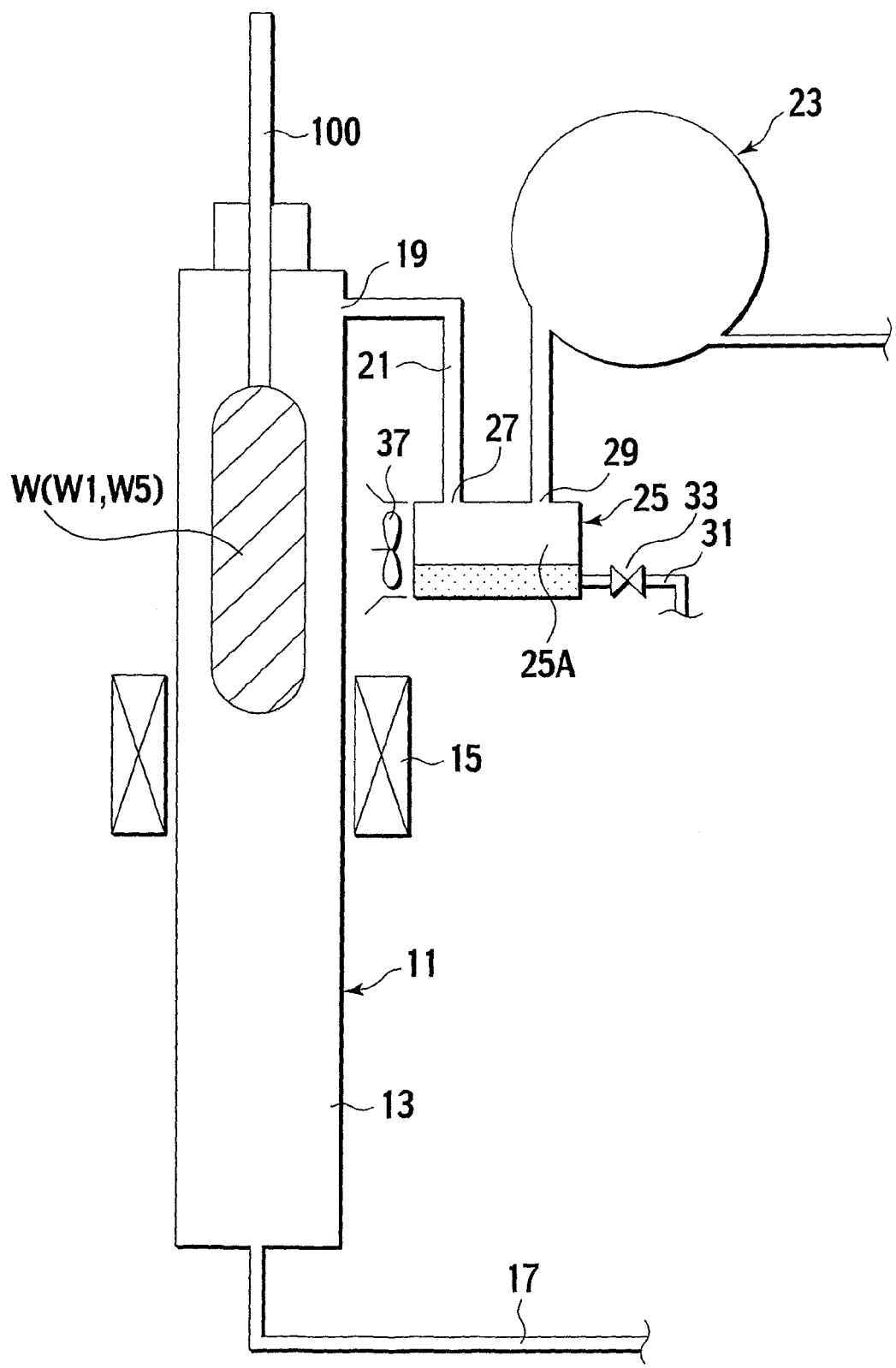
FIG. 5 is a schematic diagram illustrating a dehydration-sintering furnace of a third embodiment.

The following describes a dehydration-sintering furnace of a third embodiment with reference to FIG. 5. Also in FIG. 5, parts corresponding to those in FIG. 3 are denoted by the identical reference numerals as those in FIG. 3, and description thereof will be omitted.

The dehydration-sintering furnace of the third embodiment includes a cooling fan 37 which is provided outside the trap tank 25. As an air cooling device which cools the trap tank 25, the cooling fan 37 supplies cooling air to the trap tank 25.

Thus, the cooling air cools the trap tank 25. The trap tank 25 forcibly cools and efficiently liquefies the vapor containing moisture, which is produced in the furnace interior 13, while the vapor passes through the trap tank 25. As a result, the trap tank 25 of this embodiment collects and liquefies the vapor containing moisture, which is produced in the furnace interior 13, thus highly preventing the moisture from returning to the furnace interior 13.

Figure 6:
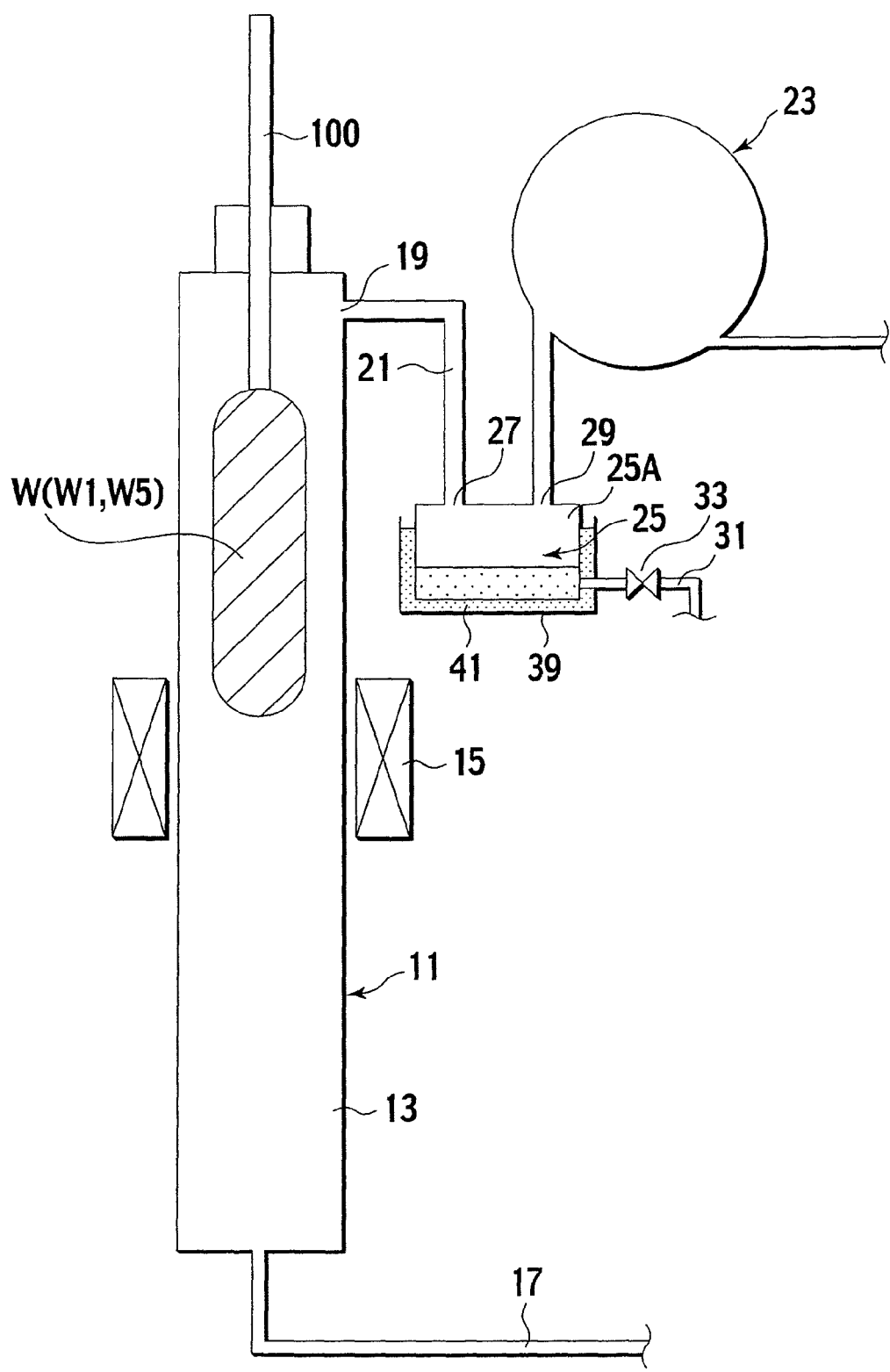
FIG. 6 is a schematic diagram illustrating a dehydration-sintering furnace of a fourth embodiment.

The following describes a dehydration-sintering furnace of a fourth embodiment with reference to FIG. 6.

The dehydration-sintering furnace of the fourth embodiment includes a coolant bath 39 which houses the trap tank 25. The coolant bath 39 is larger than the trap tank 25, with the interior of the coolant bath filled with a coolant 41 such as cooling water and alkoxy nonafluorobutane.

The coolant 41 in the coolant bath 39 directly cools the trap tank 25, and keeps the trap tank 25 at a low temperature. Thus, while the vapor containing moisture, which is produced in the furnace interior 13, passes through the trap tank 25, the trap tank 25 well cools and efficiently liquefies the vapor.

Therefore, the trap tank 25 of this embodiment collects and liquefies the vapor containing moisture, which is produced in the furnace interior 13, thus highly preventing the moisture from returning to the furnace interior 13.

Figure 7:
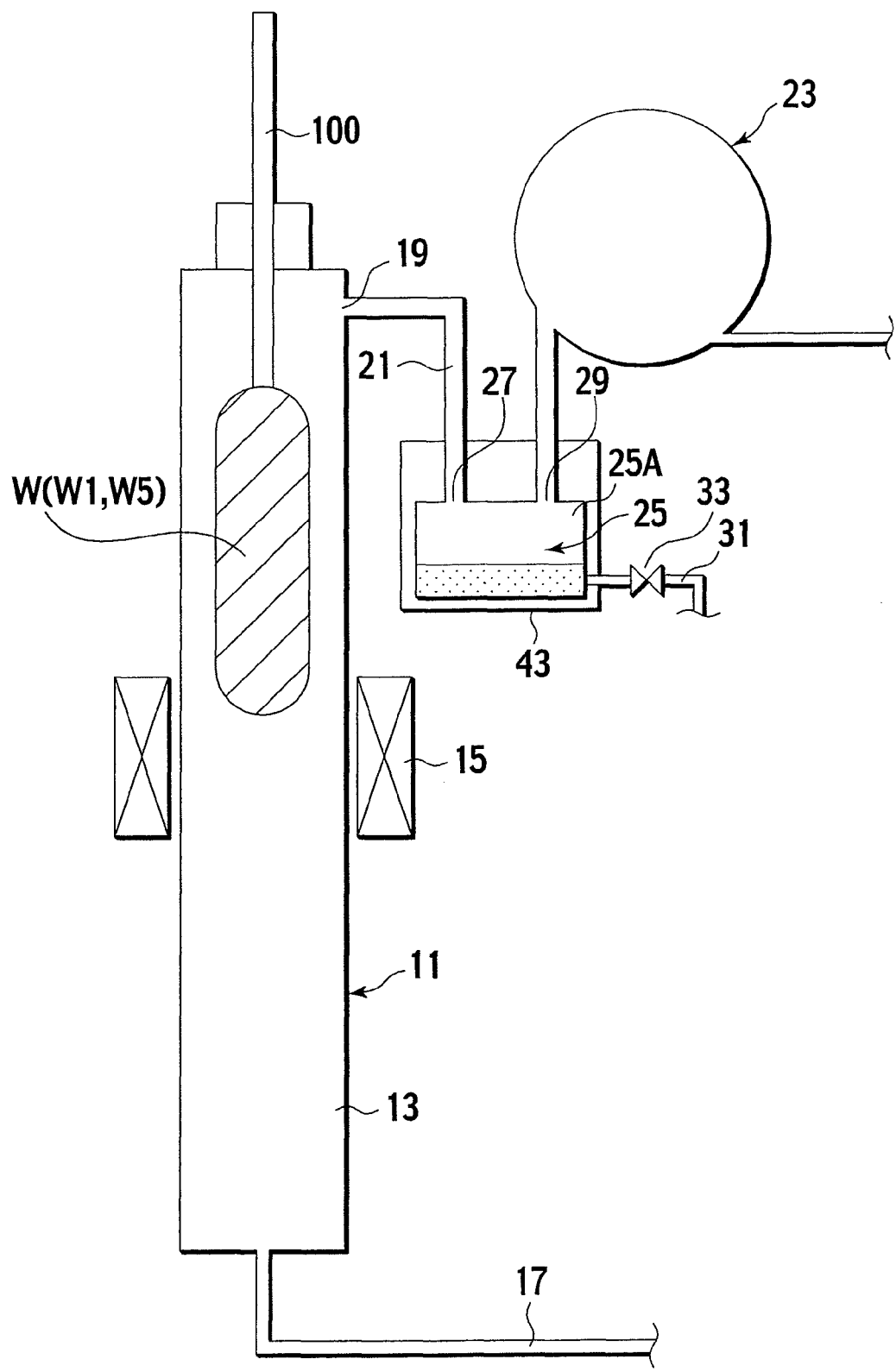
FIG. 7 is a schematic diagram illustrating a dehydration-sintering furnace of a fifth embodiment.

The following describes a dehydration-sintering furnace of a fifth embodiment with reference to FIG. 7.

The dehydration-sintering furnace of the fifth embodiment includes a refrigeration unit 43 which houses the entire trap tank 25 therein. The refrigeration unit 43 employs a normal refrigeration cycle system for cooling by subjecting a coolant to adiabatic expansion, and keeps the inside at a low temperature.

Thus, the trap tank 25 is kept at a low temperature. The trap tank 25 cools and efficiently liquefies the vapor containing moisture, which is produced in the furnace interior 13, while the vapor passes through the trap tank 25.

Therefore, the trap tank 25 of this embodiment collects and liquefies the vapor containing moisture, which is produced in the furnace interior 13, thus highly preventing the moisture from returning to the furnace interior 13.

Figure 8:
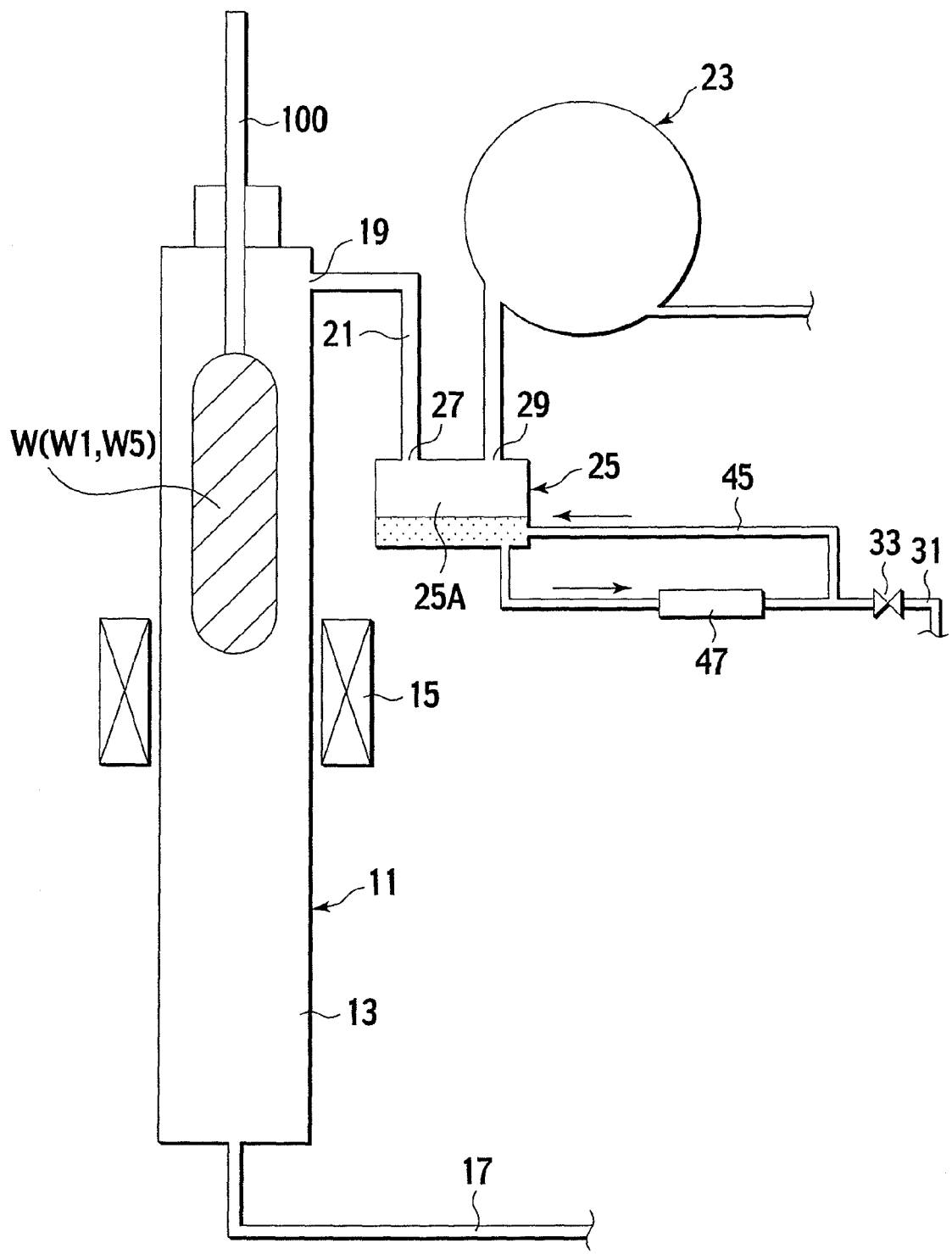
FIG. 8 is a schematic diagram illustrating a dehydration-sintering furnace of a sixth embodiment.

The following describes a dehydration-sintering furnace of a sixth embodiment with reference to FIG. 8.

The dehydration-sintering furnace of the sixth embodiment includes an outer line 45 which circulates a liquid stored in the trap tank 25. This liquid is, for example, water. The outer line 45 has a radiator 47 in the middle thereof, which is formed of a semiconductor-type, liquid-cooling, or air-cooling heat exchanger. The radiator 47 cools the liquid flowing through the outer line 45.

Thus, as a coolant, the liquid which is liquefied and collected by the trap tank 25 cools the trap tank 25. While the vapor containing moisture, which is produced in the furnace interior 13, passes through the trap tank 25, the trap tank 25 efficiently cools and liquefies the vapor.

Therefore, the trap tank 25 of this embodiment collects and liquefies the vapor containing moisture, which is produced in the furnace interior 13, thus highly preventing the moisture from returning to the furnace interior 13.

Note that the drain pipe 31 of this embodiment may be connected to the outer line 45.

Figure 9:
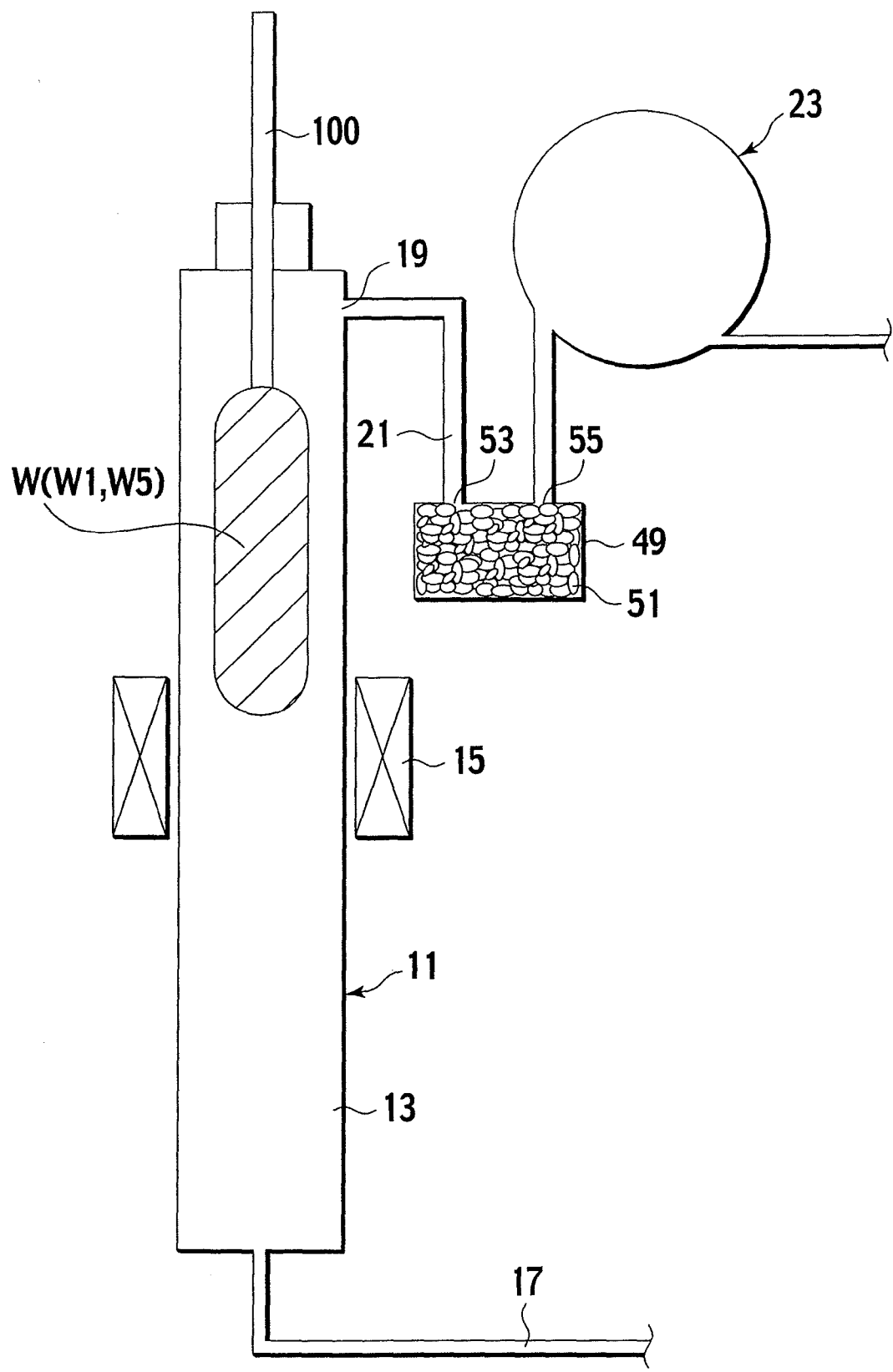
FIG. 9 is a schematic diagram illustrating a dehydration-sintering furnace of a seventh embodiment.

The following describes a dehydration-sintering furnace of a seventh embodiment with reference to FIG. 9.

The dehydration-sintering furnace of the seventh embodiment includes a dehumidification container 49, as a trap for vapor collection, in the middle of the conduit 21, that is, between the core tube 11 and the pressure-variation damper 23.

The dehumidification container 49 is filled with a moisture absorbent 51 such as silica gel and/or charcoal. The dehumidification container 49 has two fluid port openings 53 and 55. One of the fluid port openings 53 communicates with and connects to the outlet 19 of the core tube 11. The other fluid port opening 55 communicates with and connects to the pressure-variation damper 23. Vapor produced in the core tube 11 flows into the container.

A gas flow is identical to the gas flow between the furnace interior 13 and the pressure-variation damper 23. In this gas flow, the vapor containing moisture, which is produced in the furnace interior 13, is absorbed and dehumidified by the moisture absorbent 51 in the dehumidification container 49 while passing through the dehumidification container 49.

Thus, the vapor containing moisture, which is produced in the furnace interior 13, is collected in the dehumidification container 49, and the moisture does not return to the furnace interior 13. Consequently, this embodiment also avoids deterioration of the dehydration ability of the dehydration-sintering furnace. Therefore, also in the fabrication of an optical fiber with a reduced OH peak which appears at a wavelength of about 1385 nm in a transmission loss curve of the optical fiber, a high-performance optical fiber having a small transmission loss can be efficiently fabricated.

Figure 10:
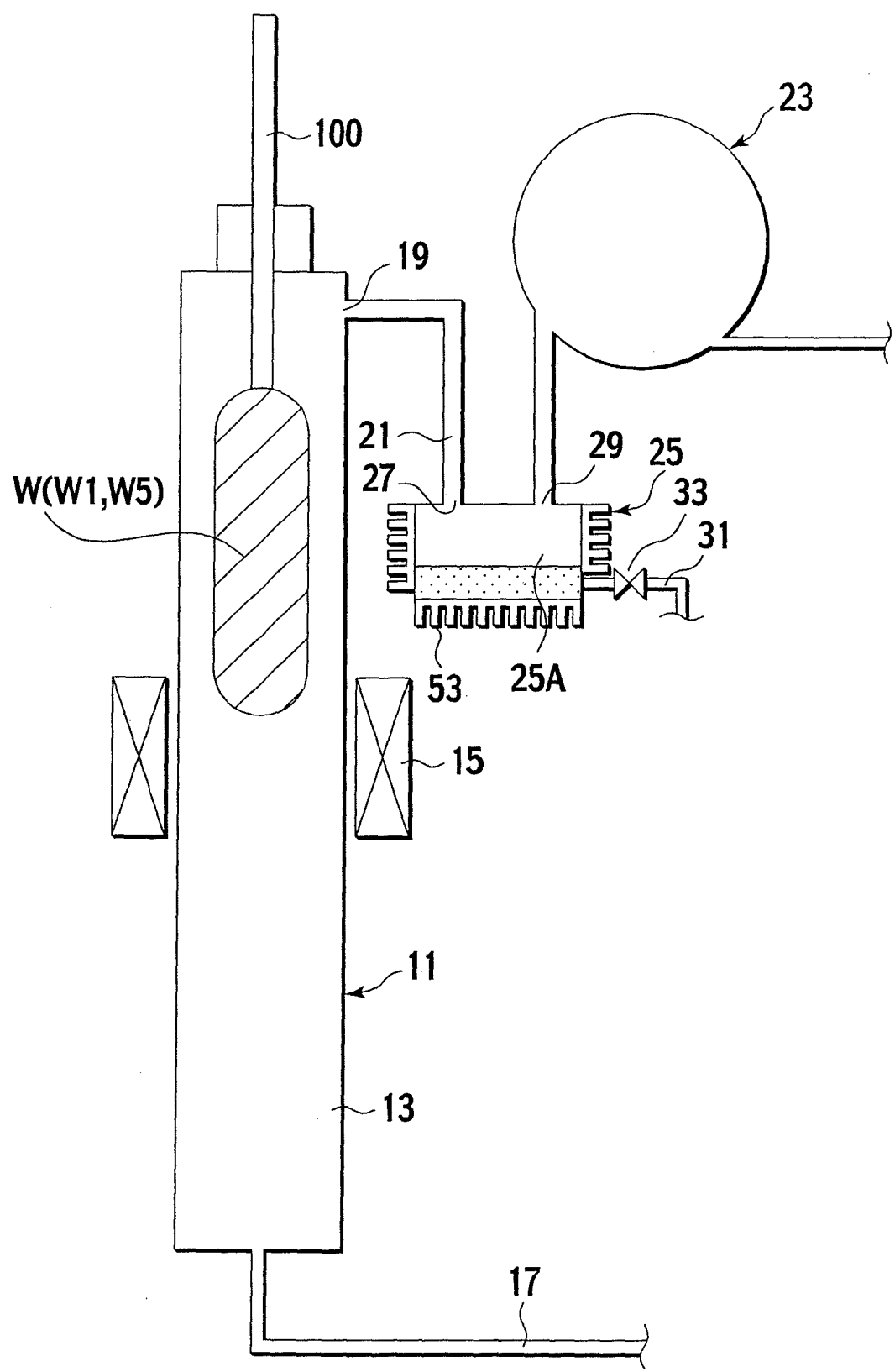
FIG. 10 is a schematic diagram illustrating a dehydration-sintering furnace of an eighth embodiment.

The following describes a dehydration-sintering furnace of an eighth embodiment with reference to FIG. 10.

The trap tank 25 of this dehydration-sintering furnace has fins 53 covering the outer surface thereof. The fins 53 are made of, for example, copper having an excellent thermal conductivity. The fins 53 allow heat exchange between the air and the trap tank 25, and cool the trap tank 25. The cooled trap tank 25 efficiently condenses vapor in the vapor phase part 25A.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A dehydration-sintering furnace comprising:
   a core tube configured to dehydrate and sinter a porous base material in fabrication of an optical fiber and having an outlet configured to discharge a vapor;
   a pressure-variation damper connected to the outlet of the core tube; and
   a trap between the core tube and the pressure-variation damper for collecting the vapor, wherein the trap comprises a trap tank configured to liquefy and collect the vapor; and a drain pipe connected to the trap tank for drainage;
   wherein the trap tank has first and second fluid port openings, the first fluid port opening communicating with the outlet of the core tube through a first conduit, and the second fluid port opening communicating with the pressure-variation damper through a second conduit;
   wherein the pressure-variation damper is selected from the group consisting of a balloon-type pressure buffer, a gas flow buffering chamber, and a solenoid valve-controlled pressure-variation absorbing container.

2. The dehydration-sintering furnace according to claim 1, further comprising:
   a cooling device configured to cool the trap tank.

3. The dehydration-sintering furnace according to claim 2, wherein the cooling device is a heat exchanger which is provided outside the trap tank.

4. The dehydration-sintering furnace according to claim 2, wherein the cooling device is a cooling fan which is provided outside the trap tank.

5. The dehydration-sintering furnace according to claim 2, wherein the cooling device is a coolant bath which is larger than the trap tank and houses the trap tank, where the interior of the coolant bath is filled with a coolant.

6. The dehydration-sintering furnace according to claim 2, wherein the cooling device is a refrigeration unit which houses the trap tank.

7. The dehydration-sintering furnace according to claim 1, wherein the trap is vertically positioned lower than the outlet of the core tube.

8. The dehydration-sintering furnace according to claim 1, wherein the first and second fluid port openings are disposed at an upper part of the tank.

9. The dehydration-sintering furnace according to claim 1, wherein the trap tank is made of a glass or resin material which is not corroded by hydrochloric acid that is contained in vapor discharged from the core tube.

10. The dehydration-sintering furnace according to claim 9, wherein said resin material is polytetrafluoroethylene (PTFE) or polyvinyl chloride (PVC).

11. The dehydration-sintering furnace according to claim 1, wherein
    the trap tank has fins covering the outer surface thereof, made of a material having an excellent thermal conductivity which allows heat exchange between the air and the trap tank to cool the trap tank.

12. A dehydration-sintering furnace comprising:
    a core tube configured to dehydrate and sinter a porous base material in fabrication of an optical fiber and having an outlet configured to discharge a vapor;
    a pressure-variation damper connected to the outlet of the core tube; and
    a dehumidification container, as a trap for vapor collection, in the middle of a conduit that is between the core tube and the pressure-variation damper,
    wherein the dehumidification container is filled with a moisture absorbent of silica gel and/or charcoal.

* * * * *